(12) United States Patent
Carlini et al.

(10) Patent No.: US 7,563,489 B2
(45) Date of Patent: Jul. 21, 2009

(54) RADIATION CURABLE PHASE CHANGE INKS CONTAINING CURABLE EPOXY-POLYAMIDE COMPOSITE GELLANTS

(75) Inventors: Rina Carlini, Mississauga (CA); Eniko Toma, Mississauga (CA); Peter G Odell, Mississauga (CA); Vaisnavi Siritharan, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 476 days.

(21) Appl. No.: 11/289,473

(22) Filed: Nov. 30, 2005

(65) Prior Publication Data

US 2007/0120921 A1 May 31, 2007

(51) Int. Cl.
*C08J 3/28* (2006.01)
*C09D 11/10* (2006.01)

(52) U.S. Cl. .................. 427/466; 522/103; 522/135; 522/141; 522/142; 522/143; 522/144

(58) Field of Classification Search ................. 427/466; 523/160; 522/103, 142, 146, 135, 141, 144
See application file for complete search history.

(56) References Cited

U.S. PATENT DOCUMENTS

| | | | |
|---|---|---|---|
| 5,059,266 A * | 10/1991 | Yamane et al. ............... 156/64 |
| 5,389,958 A | 2/1995 | Bui et al. | |
| 5,804,671 A | 9/1998 | Dones et al. | |
| 5,889,076 A | 3/1999 | Dones et al. | |
| 5,892,116 A | 4/1999 | Weiss et al. | |
| 6,239,189 B1 | 5/2001 | Narayan et al. | |
| 6,316,517 B1 | 11/2001 | Dones et al. | |
| 6,376,611 B1 * | 4/2002 | Matzinger ................ 525/221 |
| 6,492,458 B1 | 12/2002 | Pavlin | |
| 6,536,889 B1 | 3/2003 | Biegelsen et al. | |
| 6,547,380 B2 | 4/2003 | Smith et al. | |
| 6,561,640 B1 | 5/2003 | Young | |
| 6,586,492 B1 | 7/2003 | Caiger et al. | |
| 2003/0036587 A1 | 2/2003 | Kozak | |
| 2007/0120924 A1 * | 5/2007 | Odell et al. ................. 347/100 |
| 2007/0142422 A1 * | 6/2007 | Rubino et al. ............... 514/291 |
| 2008/0122914 A1 * | 5/2008 | Toma et al. ................. 347/100 |

FOREIGN PATENT DOCUMENTS

WO   WO 97/24364   7/1997

* cited by examiner

*Primary Examiner*—Susan W Berman
(74) *Attorney, Agent, or Firm*—Oliff & Berridge, PLC

(57) ABSTRACT

A radiation curable phase change ink preferably used in piezoelectric ink jet devices includes an ink vehicle that includes at least one curable epoxy-polyamide gellant, and at least one colorant. The use of the gellant enables the ink to form a gel state having a viscosity of at least $10^3$ mPa·s at very low temperatures of about 25° C. to about 100° C. The ink may thus be jetted, for example onto an intermediate transfer member surface or directly to an image receiving substrate, at very low jetting temperatures of, for example, about 40° C. to about 110° C. In a preferred method of forming an image with the ink, the ink is heated to a first temperature at which the ink may be jetted, jetted onto an image receiving or intermediate transfer member surface maintained at a second temperature at which the ink forms a gel state, if appropriate subsequently transferred from the intermediate transfer member surface to an image receiving substrate, and exposed to radiation energy to cure the curable components of the ink.

18 Claims, No Drawings

RADIATION CURABLE PHASE CHANGE INKS CONTAINING CURABLE EPOXY-POLYAMIDE COMPOSITE GELLANTS

BACKGROUND

Described herein are radiation curable phase change ink compositions ideally suited for use in ink jet ink printing devices. In embodiments, the ink includes a curable gellant additive along with a colorant. The ink vehicle may also contain additional curable components, along with an initiator for curing upon exposure to radiation.

The volume of digital color printing is expected to experience significant growth in the coming years. The color images provided by ink jet printing inks are overwhelmingly preferred in panel studies over other digital imaging systems. There is also a strong case to be made that the total cost of ownership of an ink jet printer will ultimately be cheaper than similar volume electrophotography units.

Ink jetting devices are known in the art, and thus extensive description of such devices is not required herein. As described in U.S. Pat. No. 6,547,380, incorporated herein by reference, ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric inkjet device, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, e.g., a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper.

In these systems, the crystalline wax inks are jetted onto a transfer member, for example, an aluminum drum, at temperatures of approximately 130-140° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax based ink is pressed into the paper.

However, the use of crystalline waxes places limitations on the printing process. First, the printhead must be kept at about 130° C. during the print process. Moreover, when the printhead is cooled and re-warmed, the resulting contraction and expansion of the ink requires a purge cycle to achieve optimum printhead performance. Furthermore, increased mechanical robustness is desired.

Recently, Xerox has discovered several radiation curable inks that may be jetted at much lower temperatures and that achieve robust images following curing. Reference is made to the following patent properties, each of which is incorporated herein by reference in its entirety. (1) Co-pending application Ser. No. 11/034,850 entitled "Low Level Cure Transfuse Assist for Printing with Radiation Curable Ink"; (2) Co-pending application Ser. No. 11/034,856 entitled "Ink Jet Ink Curable Via Different Polymerization Routes"; and (3) Co-pending application Ser. No. 11/034,714 entitled "Ink Jet Ink of Functionalized Waxes". U.S. Pat. Nos. 6,561,640 and 6,536,889, each incorporated herein by reference in its entirety, describe processes of forming ink jetted images using UV curable inks.

U.S. Pat. Nos. 5,804,671, 5,889,076, 6,239,189 and 6,316,517, as well as U.S. Publication No. 2003/0036587, each disclose compositions including rheology modifying agents therein. U.S. Pat. Nos. 5,804,671 and 5,889,076 describe a composition that is useful in the preparation of radiation curable coatings and comprising the reaction product of an epoxy component and an acid component comprised of an ethylenically unsaturated carboxylic acid or reactive derivative thereof, reacted in the presence of, or post-reaction blended with, a polyamide based on a polymerized fatty acid and having a number average molecular weight of less than about 10,000 g/mole. U.S. Pat. No. 6,239,189 describes a radiation-polymerizable composition that may be including in a printing ink, the composition containing at least one curable acrylate resin oligomer prepared by reacting an alkoxylated polyol with a first acid component which includes an ethylenically unsaturated carboxylic acid, and a rheology modifier prepared by reacting a diepoxide with a second acid component which includes an ethylenically unsaturated carboxylic acid or reactive derivative thereof in the presence of a polyamide based on a polymerized fatty acid. Ink jet inks and/or phase change inks are not described, and in fact it is believed that the viscosities of the inks described in this reference would be so large that such inks could not be jetted. U.S. Pat. No. 6,316,517 describes radiation-polymerizable compositions that are especially useful as or in a flush vehicle for making flushed pigments. The compositions contain at least one radiation-curable acrylated resin component and a copolymerizable rheology modifier component. In particular, the flushed pigment comprises a pigment and a flushing vehicle, the flushing vehicle comprising a substantially homogenous admixture of two or more curable acrylated resins selected from the group consisting of acrylated epoxies, acrylated urethanes and acrylated polyesters, and a rheology modifying resin copolymerizable with curable acrylate resin when subjected to radiation in the presence of a photoinitiator, for example the reaction product of (i) an epoxy component, (ii) an ethylenically unsaturated carboxylic acid or reactive derivative thereof and (iii) a fatty acid or reactive derivative thereof, said components (i), (ii) and (iii) being reacted in the presence of a polyamide based on a polymerized fatty acid. U.S. Publication No. 2003/0036587 describes a rheology controlled epoxy composition capable for use in bonding a silicon substrate to a flex circuit or a flex circuit to a pen body, comprising: (a) an epoxy resin component; (b) a rheology control agent selected from the group consisting of epoxysilanes, aminosilanes, trialkoxysilyl isocyanurate derivatives, and combinations thereof; (c) a curing agent component comprising a member selected from the group consisting of amine compounds, amide compounds, imidazole compounds, and combinations thereof; and (d) optionally, an inorganic filler component.

U.S. Pat. No. 6,586,492 describes an ink-jet ink comprising an ink jet vehicle and a colorant, the vehicle comprising at least 35% by weight, based on the total vehicle weight, of a radiation curable material and further comprising a thickener, said vehicle being a thixotropic paste at 20° C., and said vehicle having a viscosity of less than 25 centipoise at least at one temperature in the range of from 40° C. to 130° C.

U.S. Pat. No. 5,892,116 and PCT Patent Publication WO 97/24364, the disclosures of each of which are totally incorporated herein by reference, disclose gellants that gel a variety of nonpolar and polar liquids. Moreover, gelation of various monomers with subsequent polymerization of the gelled monomers forms organic zeolites and membrane materials.

While known compositions and processes are suitable for their intended purposes, a need remains for improvements in radiation curable inks, for example with respect to jetting temperatures, fusing latitude and image quality.

SUMMARY

These and other improvements are accomplished by the radiation curable phase change inks described herein, and processes of forming images with such inks.

In embodiments, the radiation curable phase change ink is comprised of a curable composite gellant comprised of a curable epoxy resin and a polyamide resin, at least one colorant and at least one initiator. The ink may also preferably include additional curable monomers, oligomers or polymers in the ink vehicle.

That is, in embodiments, the radiation curable phase change ink, preferably used in piezoelectric ink jet devices, includes a radiation curable phase change ink vehicle that includes at least one curable monomer, oligomer or polymer component, at least one curable composite gellant comprised of a curable epoxy resin and a polyamide resin, at least one initiator, and at least one colorant. The use of the composite gellant enables the ink to form a gel state having a viscosity of at least $10^{2.5}$ mPa·s at very low temperatures of about 25° C. to about 100° C. The ink may thus be jetted, for example onto an intermediate transfer member surface or directly to paper, at low jetting temperatures of, for example, about 40° C. to about 110° C.

In embodiments of forming an image with the ink, the ink is heated to a first temperature at which the ink may be jetted, then jetted onto paper or other media, such as boxboard, cardboard, plastic and fabric, maintained at a second temperature at which the ink forms a gel state, and subsequently exposed to radiation energy to initiate the curing/polymerization of curable components of the ink. The inks preferably form a gel state upon the media surface, the ink viscosity in the gel state increasing at least about $10^{2.5}$ times the viscosity of the ink at the jetting temperature.

In other embodiments of forming an image with the ink, the ink is heated to a first temperature at which the ink may be jetted, then jetted onto an intermediate transfer member surface, maintained at a second temperature at which the ink forms a gel state, subsequently transferred from the intermediate transfer member surface to an image receiving substrate, and exposed to radiation energy to cure/polymerize the curable components of the ink. The inks preferably form a gel state upon the intermediate transfer member surface, the ink viscosity in the gel state increasing at least about $10^{2.5}$ times the viscosity of the ink at the jetting temperature.

DETAILED DESCRIPTION OF EMBODIMENTS

Curable as used herein means polymerizable, i.e., a material that may be cured via polymerization, including for example free radical routes, and/or in which polymerization is photoinitiated though use of a radiation sensitive photoinitiator.

Radiation curable as used herein is intended to cover all forms of curing upon exposure to a radiation source, including light and heat sources and including in the presence or absence of initiators. Example radiation curing routes include, but are not limited to, curing using ultraviolet (UV) light, for example having a wavelength of 200-400 nm or more rarely visible light, preferably in the presence of photoinitiators and/or sensitizers, curing using e-beam radiation, preferably in the absence of photoinitiators, curing using thermal curing, in the presence or absence of high temperature thermal initiators (and which are preferably largely inactive at the jetting temperature), and appropriate combinations thereof.

The one or more organic gellants function to dramatically increase the viscosity of the radiation curable phase change ink within a desired temperature range. In particular, the gellant forms a semi-solid gel in the ink vehicle at temperatures below the specific temperature at which the ink is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like, which upon stimulation by physical forces such as temperature or mechanical agitation or chemical forces such as pH or ionic strength, can reversibly transition from liquid to semi-solid state at the macroscopic level. The inks exhibit a thermally reversible transition between the semi-solid gel state and the liquid state when the temperature is varied above or below the gel phase transition of the ink. This reversible cycle of transitioning between semi-solid gel phase and liquid phase can be repeated many times in the ink formulation. Mixtures of one or more gellants may be used to effect the phase-change transition.

The phase change inks in embodiments may be liquid or solid at room temperature. It is desired for the phase change radiation curable inks to have a viscosity of less than about 50 mPa·s, preferably less than about 30 mPa·s, for example from about 3 to about 30 mPa·s, more preferably from about 5 to about 20 mPa·s, most preferably from about 8 to about 13 mPa·s, at the temperature of jetting. In preferred embodiments, the inks are jetted at low temperatures, in particular at temperatures below 110° C., for example about 40° C. to about 110° C., preferably about 50° C. to about 110° C., more preferably about 60° C. to about 90° C., although the jetting temperature can be outside this range.

At such low jetting temperatures, the conventional use of temperature differential between the jetted ink and the substrate upon which the ink is jetted in order to effect a rapid phase change in the ink (i.e., from liquid to solid) may not be effective. The gellant can thus be used to effect a rapid viscosity increase in the jetted ink upon the substrate. In particular, jetted ink droplets would be pinned into position on a receiving substrate such as an image receiving medium (e.g., paper) or an intermediate transfer member (e.g., a transfuse drum or belt) that is at a temperature cooler than the ink jetting temperature of the ink through the action of a phase change transition in which the ink undergoes a significant viscosity change from a liquid state to a gel state (or semi-solid state).

In embodiments, the temperature at which the ink forms the gel state is any temperature below the jetting temperature of the ink, for example any temperature that is about 5° C. or more below the jetting temperature of the ink. In embodiments, the gel state may be preferably formed at temperatures from about 25° C. to about 100° C., preferably from about 30° C. to about 70° C., more preferably from about 30° C. to about 50° C., although the temperature can be outside this range. There is a rapid and large increase in ink viscosity upon cooling from the jetting temperature at which the ink is in a liquid state, to the gel transition temperature, at which the ink converts to the gel state. The viscosity increase is preferably at least a $10^{2.5}$-fold increase in viscosity.

It has been found that optimum transfer efficiency from an intermediate transfer surface and optimum print quality may be achieved if the viscosity of the ink image deposited on the drum is greatly increased after jetting the ink, so as to obtain a stable and transferable image that will not smear. A suitable gellant for the ink would gel the monomers/oligomers in the ink vehicle quickly and reversibly, and demonstrate a narrow phase-change transition, for example within a temperature range of about 30° C. to about 100° C., preferably of about 30° C. to about 70° C., although the transition range may also be outside of these temperature ranges. The gel state of the ink should also preferably exhibit a minimum of $10^{2.5}$ mPa·s, more preferably $10^3$ mPa·s, increase in viscosity at preferred transferring temperatures, e.g., from about 30 to about 70° C., compared to the viscosity at the jetting temperature. Of particular preference are gellant containing inks that rapidly increase in viscosity within 5° C. to 10° C. below the jetting temperature and ultimately reach a viscosity above $10^4$ times the jetting viscosity, and most preferably about $10^5$ times the jetting viscosity. In direct to paper applications, increases in viscosity greater than $10^6$, while providing minimal show through or feathering of the image, tend to have insufficient drop spread and may preserve undesirable artifacts of jetting, such as drop structure. In intermediate transfer architectures, the ink image can be spread and smoothed by external pressure allowing much higher increases in viscosity by the gellant containing ink. However, curing such a high viscosity ink of greater than $10^7$ mPa·s is difficult to do efficiently without reheating the ink because of the limited mobility of the free radical reactants. Further, in embodiments that employ intermediate transfer of the image, the gel ink preferably also has good elastic properties to enable complete transfer from the drum, a property which can be inferred from the value of the storage modulus (G' max) at the transfuse temperature.

When the inks are in the gel state, the viscosity of the ink is at least about 1,000 mPa·s, preferably at least about 10,000 mPa·s, more preferably at least about 100,000 mPa·s. Preferred viscosity values in the gel state are in the range of from about $10^3$ to about $10^9$ mPa·s, and most preferably from about $10^{4.5}$ to about $10^{6.5}$ mPa·s, although the gel state viscosity can be outside of these ranges. The preferred gel phase viscosity can vary with the print process. For example, the highest viscosities are preferred when employing intermediate transfer, or when jetting directly to porous paper in order to minimize the effects of ink bleed and feathering. On the other hand, less porous substrates such as plastic may require lower viscosities that control dot gain and agglomeration of individual ink pixels. The gel viscosity can be controlled by ink formulation and substrate temperature. An additional benefit of the gel state for radiation curable inks is that higher viscosities of about $10^3$-$10^4$ mPa·s can reduce oxygen diffusion in the ink, which in turn leads to a faster rate of cure in free radical initiation.

In embodiments, at least one of the one or more gellants in the ink vehicle is a composite material comprised of a polymerizable epoxy resin that is chemically functionalized with either ethylenically unsaturated groups or hydrocarbon groups or combinations thereof, and a polyamide resin based on a polymerized fatty acid and a polyamine, and an optional reactive diluent that optionally contains unsaturated functional groups.

The gellant composition comprised of epoxy resin and polyamide resin exhibits a thermally reversible and narrow gel phase transition when formulated into a phase change radiation curable ink composition. For example, at a temperature of 30° C. suitable for transfuse printing, the radiation curable gel ink exhibits gel state viscosities of at least $10^4$ mPa·s. Further, at temperatures of from about 30° C. to about 50° C., the ink preferably has a storage modulus of at least $10^2$ Pa. Such viscoelastic rheology is important for transfuse printing onto an intermediate transfer surface, since the gelled ink droplets are able to transfer the ink from the intermediate transfer surface to an image receiving substrate such as paper. Further, the ink does not typically experience any obvious phase-separation (separating into its liquid and solid material components) during the transfuse process by the action of the pressure roll.

The epoxy resin component in the composite gellant can be any suitable epoxy group-containing material. In preferred embodiments, the epoxy resin component is selected from among the diglycidyl ethers of either polyphenol-based epoxy resin or a polyol-based epoxy resin, or mixtures thereof. That is, the preferred epoxy resins have two epoxy functional groups that are preferably located at the terminal ends of the molecule. The polyphenol-based epoxy resin is preferably a bisphenol A-co-epichlorohydrin resin with not more than two glycidyl ether terminal groups. The polyol-based epoxy resin is preferably a dipropylene glycol-co-epichlorohydrin resin with not more than two glycidyl ether terminal groups. Preferred epoxy resins have a weight average molecular weight in the range of about 200 to about 800, and more preferably of about 300 to about 700. Commercially available sources of the preferred epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia Pa. may also be used.

Further, the epoxy resin component contains at least one ethylenically unsaturated functional group that is curable via free-radical initiation and enables chemical bonding of the gellant to the cured ink vehicle. The epoxy resin component is thus functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth) acrylic acid.

Furthermore, the epoxy resin component may additionally be functionalized by reaction with a saturated hydrocarbon monocarboxylic acid comprised of at least 8 carbons, and preferably at least 10 carbons, such as capric acid, lauric acid, myristic acid, stearic acid and 12-hydroxystearic acid, and the like. The saturated monocarboxylic acid is preferably a linear, non-branched hydrocarbon acid, rather than a branched hydrocarbon acid, the latter which can act to physically disrupt the gellant network structure. The weight-percent ratio of the unsaturated monocarboxylic acid to linear saturated monocarboxylic acid that is used to chemically functionalize the epoxy resin component can range from 1:1 to about 20:1, and is most preferably from 2:1 to 5:1, but can also be outside of these ranges. The condensation reaction between the terminal epoxide functional groups on the epoxy resin and the unsaturated or saturated carboxylic acids is accelerated by use of a suitable catalyst, for example triphenyl phosphine, bulky tertiary bases such as DABCO, triisopropylamine, alkoxylate salts such as potassium tert-butoxide, and the like. The amount of catalyst used is typically less than 5 wt %, and most preferably less than 1 wt % of total solid components.

As the polyamide component of the epoxy-polyamide composite gellant, any suitable polyamide material may be used without limitation. Preferably, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid and the like, and a polyamine, most preferably a diamine (for example, alkylenediamines such as ethylenediamine, DYTEK® series diamines, poly(alkyleneoxy)diamines, and the like, or also copolymers of polyamides such as polyester-polyamides and polyether-polyamides. One or more polyamide resins may be used in the formation of the curable gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVAGEL® polyamide resins from Arizona Chemical Company, and variants thereof including polyether-polyamide resins may be employed. The composition of the SYLVAGEL® resins obtained from Arizona Chemical Company are disclosed in U.S. Pat. Nos. 6,492,458 and 6,399,713 and U.S. Patent Publication No. US 2003/0065084, which are totally incorporated herein by reference, and are described as polyalkyleneoxydiamine polyamides with the general formula,

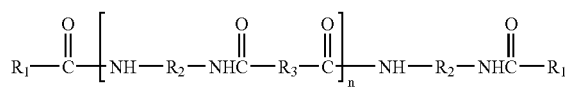

wherein $R_1$ is an alkyl group having at least seventeen carbons, $R_2$ includes a polyalkyleneoxide, $R_3$ includes a C-6 carbocyclic group, and n is an integer of at least 1.

The polyamide resin is preferably of low molecular weight, with number average molecular weight of less than about 15,000 grams per mole, more preferably less than 10,000 grams per mole, and most preferably less than 7,000 grams per mole, as determined by gel permeation chromatography (GPC) referenced with a polystyrene standard. The amine number of the polyamide resin is typically low, with values in the range of 0 to 10, and most preferably with values in the range of 0 to 5.

The curable epoxy polyamide composite gellants can be prepared by any suitable method. However, such are preferably prepared by mixing the epoxy resin components with the ethylenically unsaturated group-containing component and optional saturated hydrocarbon monocarboxylic acid, in the presence of the polyamide resin and an esterification catalyst, and then heating the mixture over several hours while stirring sufficiently to blend all of the components so as to obtain an homogeneous mixture. The reaction is allowed to progress for a suitable time period, whereby conversion to the desired products is monitored spectroscopically and by the change in total acid number.

The relative weight-percent ratio of epoxy resin components and polyamide resin components in the gellant composition may range from, for example, 20:1 to 0.1:1, but can also be outside of these ranges. The impact of this ratio upon ink performance is multi-faceted. While the structures of the epoxy resin and polyamide resin components can vary, in general the epoxy resin component provides more solubility in common reactive diluents while the less soluble, more polar polyamide component provides greater gel properties. The epoxy resin component is more readily reacted with acrylic acid to provide acrylate functionality than the polyamide resin, and thus imparts higher levels of cure to the final image.

An illustration of the effect of the ratio of epoxy resin to polyamide resin with a particular selection of the respective resins upon the storage modulus G' of the ink may be seen from the fact that at a ratio of 1.3:1.0, the storage modulus of the ink is $7 \times 10^3$ Pa and the ratio of jetting viscosity to gel viscosity at 30° C. is $1.5 \times 10^5$, while at a ratio of 0.5:1.0, the storage modulus is $3.4 \times 10^2$ Pa and the ratio of jetting viscosity to gel viscosity at 30° C. is $9.4 \times 10^3$.

The results indicate that two gellants with different relative ratios of the very same epoxy resin and polyamide resin components can exert a dramatically different effect on the viscoelastic behavior of the ink composition.

The polyamide resin is believed to function as the principal gelling agent in the composite gellant, since polyamides, and amide groups in general, are known to form extensive hydrogen-bonded networks in the presence of other solvents or components that are proton sources, including alcohols, phenols, amines and carboxylic acids.

The radiation curable phase change ink compositions are comprised of the curable epoxy-polyamide composite gellant in an amount from about 1% to about 50% by weight of the ink, more preferably from about 5% to about 25% by weight of the ink, and most preferably from about 7% to about 15% by weight of the ink, although the value can also be outside of this range.

In the composition of the curable epoxy-polyamide composite gellant is also optionally included a reactive diluent. Such diluents may include one or more monomers, one or more oligomers, one or more polymers, or any mixture/combination thereof. The reactive diluent can function as a solvent to dilute the gellant composition and enable the appropriate rheological properties, such as gellant viscosity and elasticity, but does not participate in any way with the chemical functionalization of the epoxy resin component. Furthermore, the optional reactive diluent becomes a part of the liquid components integrated within the gellant network structure, such that upon curing of an ink that is comprised of the same reactive diluent, the composite gellant material will be covalently linked with the cured ink vehicle and will thereby resist phase separation during the printing process. Typical reactive diluents that are suitable for the gellant composition include monomers such as (meth)acrylate esters such as isobornyl (meth)acrylate and lauryl (meth)acrylate, vinyl ethers or vinyl esters, allylic esters or allylic ethers, vinyl or allyl arenes such as styrene and vinyl toluene, and the like. Commercially available sources of preferred reactive diluents that are also used within the ink vehicle composition include, for example, propoxylated neopentyl glycol diacrylate (available from Sartomer Co. Inc. as SR9003), and glycerol propoxylate triacrylate, and the like.

For example, where the organic gellant is cationically curable (e.g., wherein the curable functional groups include epoxy, vinyl ether, allyl, styrene and other vinyl benzene derivatives, or oxetane groups), additional cationically curable monomers or oligomers may be included in the ink vehicle.

Cationically curable monomers may include, for example, cycloaliphatic epoxide, and preferably one or more polyfunctional cycloaliphatic epoxides. The epoxy groups may be internal or terminal epoxy groups such as those described in WO 02/06371, incorporated herein by reference. Multifunctional vinyl ethers can also be used. Additional examples of cationically curable monomers/oligomers include the following:

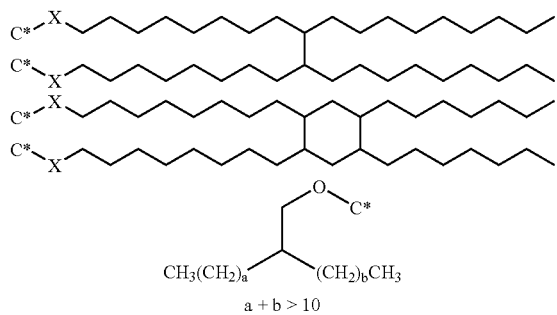

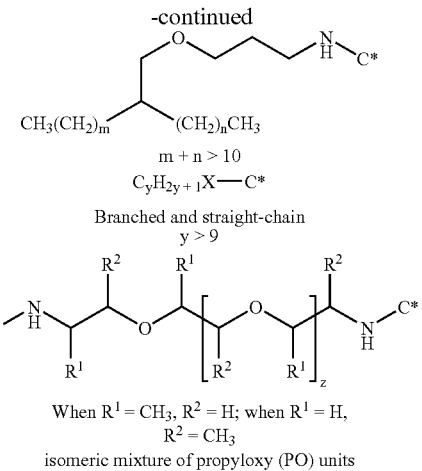

$m + n > 10$ $C_yH_{2y+1}X—C^*$

Branched and straight-chain
$y > 9$

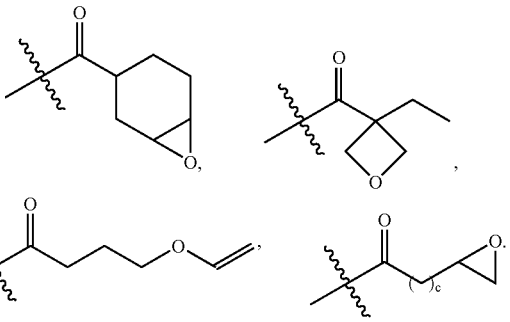

When $R^1 = CH_3$, $R^2 = H$; when $R^1 = H$,
$R^2 = CH_3$
isomeric mixture of propyloxy (PO) units In the foregoing, X may be O or NH, and C* may be Radically curable monomers, which are preferred given the nature of the polyamide towards radical polymerization, may include, for example, acrylate and methacrylate monomers. As relatively non polar monomers, mention may be made of isobornyl (meth)acrylate, lauryl (meth)acrylate, isodecyl(meth)acrylate, caprolactone acrylate, 2-phenoxyethyl acrylate, isooctyl(meth)acrylate, and butyl acrylate. In addition, multifunctional acrylate monomers/oligomers may be used not only as reactive diluents, but also as materials that can increase the crosslink density of the cured image, thereby enhancing the toughness of the cured images. As multifunctional acrylates and methacrylates, mention may be made of pentaerythritol tetra(meth)acrylate, 1,2 ethylene glycol di(meth)acrylate, 1,6 hexanediol di(meth)acrylate, 1,12-dodecanol di(meth)acrylate, tris (2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR 494), and the like.

The reactive diluent material is preferably added to the ink in amounts of from, for example, 0 to about 80% by weight, preferably about 1 to about 80% by weight, more preferably about 35 to about 70% by weight, of the ink.

The ink compositions also contain a colorant. Any desired or effective colorant can be employed in the inks, including dyes, pigments, mixtures thereof, and the like, provided that the colorant can be dissolved or dispersed in the ink vehicle. Pigments are the preferred colorant as they are typically cheaper and more robust than dyes. The color of many dyes can be altered by the polymerization process occurring during the curing stage, presumably from attack of their molecular structure by the free radicals. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are preferred.

Pigments are also suitable colorants for the inks. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFASTt® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like.

The colorant is preferably included in the ink in an amount of from, for example, about 0.1 to about 15% by weight of the ink, preferably about 2.0 to about 8% by weight of the ink.

The radiation curable phase change ink may also include an initiator in embodiments where an initiator is desirable for assisting in curing of the ink. As mentioned above, the initiator may be a thermal initiator and/or a photoinitiator. Suitable thermal initiators include ones that undergo temperature-induced decomposition to form organic radical species, and proceed to cure the ink by free radical polymerization of the components containing ethylenically unsaturated groups. Preferable are thermal initiators that are rated with a ten-hour half-life at high temperatures, for example above 120° C., including organic peroxides such as t-butyl cumyl peroxide, di(t-amyl) peroxide, 2,5-di(t-butylperoxy)-2,5-dimethyl-3-hexyne, cumene hydroperoxide, t-butyl hydroperoxide, and the like.

A photoinitiator that absorbs radiation, for example UV light radiation, to initiate curing of the curable components of the ink may be used. As the photoinitiator for inks that are cured by free radical polymerization, e.g., inks containing acrylate groups or inks comprised of polyamides, mention may be made of photoinitiators such as benzophenones, benzoin ethers, benzil ketals, α-hydroxyalkylphenones, α-aminoalkylphenones and acylphosphine photoinitiators sold under the trade designations of IRGACURE and DAROCUR from Ciba. Specific examples include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl) butanone-1 (available as Ciba IRGACURE 369); 2-hydroxy-1-(4-(4-(2-hydroxy-2-methylpropionyl)-benzyl)-phenyl)-2-methylpropan-1-one (available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methy-1-(4-(1-methylvinyl)phenyl) propanone); 2-hydroxy-2-methyl-1-phenyl-1-propanone; benzyl-dimethylketal; and mixtures thereof. Mention may also be made of amine synergists, i.e., co-initiators that donate a hydrogen atom to a photoinitiator and thereby form a radical species that initiates polymerization (amine synergists can also consume oxygen dissolved in the ink—as oxygen inhibits free radical polymerization its consumption increases the speed of polymerization), for example such as ethyl-4-dimethylaminobenzoate and 2-ethylhexyl-4-dimethylaminobenzoate.

This list is not exhaustive, and any known photoinitiator that initiates the free radical reaction upon exposure to a desired wavelength of radiation such as UV light can be used without limitation.

It is preferred that the photoinitiator absorb radiation of about 200 to about 420 nm wavelengths in order to initiate cure, although use of initiators that absorb at longer wavelengths, such as the titanocenes which may absorb up to 560 nm, can also be used without restriction.

The total amount of initiator included in the ink may be from, for example, about 0.5 to about 15%, preferably from about 1 to about 10%, by weight of the ink.

The radiation curable phase change inks can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10, commercially available from Ciba Specialty Chemicals; GENORAD 16 and GENORAD 40 commercially available from Rahn AG, Zurich, Switzerland, and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink.

The radiation curable phase change inks of embodiments may further include conventional type additives to take advantage of the known functionality associated with such conventional additives. Such additives may include, for example, defoamers, slip and leveling agents, pigment dispersants, etc. The inks may also include additional monomeric or polymeric materials as desired.

The inks may be prepared by any suitable technique. As an example, the inks may be prepared by first dissolving any initiator components into the reactive diluent or curable monomer and optional oligomers mixture, adding the specified amount of curable composite gellant, preferably less than 50% and more preferably less than 15% by weight of the ink, heating the mixture to obtain a single phase with low viscosity and thereafter adding this hot mixture slowly to a heated pigment dispersion (preferably as a concentrate) while agitating the mixture. The ink may then be filtered, preferably at an elevated temperature, through a filter to remove extraneous particles. The method of preparation for the inks may be modified so as to accommodate the type of reactive gelling agents used for the preparation of the inks. For example, a concentrate of the gelling agent may be prepared in one of the components of the ink prior to the addition of the other components. Solutions containing co-gelling agents can also be prepared by a method similar to the one described above. Further examples of ink preparation methods are set forth in the Examples below.

The inks described herein are preferably jetted at temperatures of less than about 110° C., preferably from about 40° C. to about 110° C., most preferably from about 65° C. to about 90° C. The inks are thus ideally suited for use in piezoelectric ink jet devices.

The inks can be employed in an apparatus for direct printing ink jet processes, wherein when droplets of the melted ink are ejected in an imagewise pattern onto a recording substrate, the recording substrate is a final recording substrate.

The inks can also be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

The inks are suited for jetting onto an intermediate transfer substrate, e.g., an intermediate transfuse drum or belt. In a suitable design, the image may be applied by jetting appropriately colored inks during, e.g., four to eighteen rotations (incremental movements) of the intermediate transfuse member with respect to the ink jetting head, i.e., there is a small translation of the printhead with respect to the substrate in between each rotation. This approach simplifies the printhead design, and the small movements ensure good droplet registration. Transfuse, i.e., a transfer and fusing step, is desirable in forming the image as transfuse enables a high quality image to be built up on a rapidly rotating transfer member. Transfuse typically involves jetting the ink from the ink jet head onto an intermediate member such as a belt or drum, i.e., the transfuse member. This allows the image to be rapidly built onto the transfuse member for subsequent transfer and fusing to an image receiving substrate. Alternatively, the same image build up can be carried out directly on the image substrate, for example paper.

The intermediate transfer member may take any suitable form, although it is preferably a drum or belt. The member surface may be at room temperature, although in embodiments it is preferable to heat the member such that a surface temperature thereof is, for example, within the gel state temperature range for the ink. For example, the surface may be maintained at a temperature of about 25° C. to about 100° C., preferably from about 30° C. to about 70° C., more preferably from about 30° C. to about 50° C. In this way, the jetted ink may be made to rapidly form a gel, which gel is maintained on the surface of the transfer member until transfer to the image receiving substrate. Thus, the ink is preferably heated to a first temperature at which the ink may be jetted, e.g., above the gel transition temperature of the ink, which first temperature may be, for example, from about 40° C. to about 110° C. The second temperature at which the gel forms is less than the first temperature, for example is from about 25° C. to about 100° C., as discussed above.

Once upon the intermediate transfer member surface, the jetted ink may be exposed to radiation to a limited extent so as to effect a limited curing of the ink upon the intermediate member surface. This intermediate curing is not to cure the ink to its full extent, but merely to assist in setting the ink up so that it may be transferred to the image receiving substrate with the appropriate amount of penetration, which requires the ink droplets to have a certain rheology before transfer. For controlling the extent of the curing if an intermediate cure is practiced, reference is made to Co-pending application Ser. No. 11/034,850 entitled "Low Level Cure Transfuse Assist for Printing with Radiation Curable Ink", and Co-pending application Ser. No. 11/005,991 entitled "An Apparatus and Process for Printing Ultraviolet Curable Inks", each incorporated herein by reference. This intermediate curing step is not needed, however, as often the gel state is sufficient to impart the desired rheology to the ink droplets.

Following jetting to the intermediate transfer member and optional intermediate curing thereon, the ink is thereafter transferred to an image receiving substrate. The substrate may be any suitable material such as paper, fabric, plastic, glass, metal, etc., although the ink is most preferably used in forming images on paper. Following transfer to the substrate, the ink is then cured by exposing the image on the substrate to radiation. For example, radiation having an appropriate wavelength, mainly the wavelength at which the ink initiator absorbs radiation, may be used. This initiates the curing reaction of the ink. The radiation exposure need not be long, and may occur for example, about 0.05 to about 10 seconds, more preferably from about 0.2 to about 2 seconds. These exposure times are more often expressed as substrate speeds of the ink passing under a UV lamp. For example the microwave energized, doped mercury bulbs available from UV Fusion (Gaithersburg, Md.) are placed in an elliptical mirror assembly that is 10 cm wide; multiple units may be placed in series. Thus a belt speed of 0.1 $ms^{-1}$ would require 1 second for a point of an image to pass under a single unit, while a belt speed 4.0 $ms^{-1}$ would require 0.2 s to pass under four bulb assemblies The radiation to cure the polymerizable components of the ink is preferably provided by a variety of possible techniques, including but not limited to heat, a xenon lamp, laser light, D or H bulb, LED, a UV light source, etc. The curing light may be filtered, if desired or necessary. The curable components of the ink react to from a cured or crosslinked network of appropriate hardness. Preferably, the curing is substantially complete to complete, i.e., at least 75% of the curable components are cured (reacted and/or crosslinked). This allows the ink to be substantially hardened, and thereby to be much more scratch resistant, and also adequately controls the amount of showthrough on the substrate.

Inks herein, which include curable epoxy-polyamide composite gellants, exhibit a remarkable ability to maintain the image integrity while on the transfer drum surface. This property can be expressed as a reduction of the extent of drop coalescence of the gellant containing ink over inks without gellant. Additionally, little to no ink remains to be removed from the intermediate transfer member surface following transfer to the image receiving substrate. While not wishing to be limited by theory, it is believed that better transfer efficiency results from an elastic gel as expressed by the storage modulus G'. As G' increases, particularly as it exceeds the loss modulus G", the gellant-containing ink becomes more resilient to the shear stress of the transfer process.

In another embodiment, the recording substrate onto which droplets of the melted ink are ejected in an imagewise pattern, whether it is the final recording substrate (in a direct printing process) or an intermediate transfer member (in an indirect printing process), is maintained at a temperature at which the ink is in the gel state. Without being limited to any specific theory, it is believed that in this embodiment, the substrate temperature (either the final substrate or the intermediate transfer member) is set at an optimum temperature for the formation of a reinforcing gel network. It is believed that the image thus formed will have improved robustness as a result of the reinforcement of the ink vehicle with the gellant. Upon cooling or, in the case of an indirect printing method, transfer to the final substrate, the gellant network is frozen within the ink vehicle.

When an indirect printing process is used, the intermediate transfer member can be of any desired or suitable configuration, such as a drum or roller, a belt or web, a flat surface or platen, or the like. The temperature of the intermediate transfer member can be controlled by any desired or suitable method, such as by situating heaters in or near the intermediate transfer member, using air flow to cool the transfer member, or the like. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member, as disclosed in, for example, U.S. Pat. No. 5,389,958. Transfer from the intermediate transfer member to the final recording substrate can be made by any desired or suitable method, such as by passing the final recording substrate through a nip formed by the intermediate transfer member and a back member, which can be of any desired or effective configuration, such as a drum or roller, a belt or web, a flat surface or platen, or the like. Transfer can be carried out at any desired or effective nip pressure, for example from about 5 pounds per square inch to about 2,000 pounds per square inch, preferably from about 10 to about 200 pounds per square inch, although the pressure can be outside of these ranges. The transfer surface may be hard or soft and compliant. Subsequent to transfer, the image on the substrate is cured. The radiation to cure the photopolymerizable components of the ink is preferably provided by a variety of possible techniques, including but not limited to a xenon lamp, laser light, medium pressure mercury lamps, micro-wave excited mercury lamps often known as a H bulb, doped mercury lamps often referred to as D or V bulbs, LED etc. Without being limited to any specific theory, it is believed that in this embodiment, the ink is transferred to the final recording substrate in a semi-solid state, facilitating penetration of the ink into the final substrate (paper fibers, for example) and enabling improved adhesion, reduced showthrough, and reduced pile height.

The following examples of curable epoxy polyamide gellants, and radiation-curable phase-change ink compositions comprised of said gellants, further illustrate the foregoing embodiments.

Example 1

Gellant

A curable epoxy-polyamide composite gellant was prepared as follows. In a 200 ml round bottom flask equipped with reflux condenser, thermometer and addition funnel, was charged a bisphenol A-co-epichlorohydrin epoxy resin commercially available from Dow Chemical as DER 383 resin (11.25 g, or 45% by weight of total material), a polyamide resin VERSAMID 335 available from Cognis Corp. (6.25 g, or 25% by weight), and triphenylphosphine as catalyst (0.0875 g, or 0.35% by weight). The mixture was heated to 90° C. and stirred for 1 hour, after which time was first added a prepared solution of acrylic acid (3.75 g, 15% by weight) and 4-methoxyphenol as polymerization inhibitor (0.0125 g, 0.05% by weight), followed with a second prepared solution containing lauric acid (1.0625 g, 4.25% by weight) and triphenylphosphine (0.0875 g, 0.35% by weight). The temperature of the reaction mixture was increased to 115° C. and stirred for an additional 3 hours, thereby forming the acrylate-modified epoxy-polyamide composite gellant. A reactive diluent was then added to the mixture, a propoxylated neopentyl glycol diacrylate diluent (NPPOGDA) available as SR 9003 from Sartomer Corp. (25 g, 10% by weight) while gradually cooling the mixture down. The product was obtained as a clear, pale yellow gelatinous material with a yield of 45.8 grams. $^1$H-NMR spectroscopic analysis (300 MHz, $CDCl_3$) of this material shows the presence of a new set of acrylate hydrogens that differed in chemical shift from those of acrylic acid, and did not clearly reveal the presence of any unreacted epoxy-group hydrogens.

Examples 2-4

Gellants

Three additional gellants were prepared using the same materials in the process described in Example 1, except using different relative amounts of the epoxy resin DER 383, polyamide resin VERSAMID 335, and acrylic and lauric acid components (based on weight percentages of total charged materials). Table 1 summarizes the compositions of the gellant Examples 1 to 4. The gellant composition of Example 4 did not have any reactive diluent in its composition.

Example 5

Gellant

The gellant of Example 5 was prepared by the same process as described for the gellant in Example 1, except that a different polyamide resin component was selected, which is a polyether-polyamide copolymer resin SYLVAGEL #1015-32 obtained from Arizona Chemical. No reactive diluent component was used in the composition of this gellant.

Examples 6-8

Gellants

Three additional gellants were prepared by the same process as described for preparing the gellant of Example 1, except that the polyamide resin component was VERSAMID 795, obtained from Cognis Corp. The relative amounts of epoxy resin DER 383, the polyamide resin, and acrylic and lauric acid components were varied for each of these three gellant examples.

Example 9

Gellant

A curable epoxy-polyamide composite gellant was prepared as follows. In a 200 ml round bottom flask equipped with reflux condenser, thermometer and addition funnel, 12.5 g (50% by weight of total materials) of DER 736 (a dipropylene glycol-based epoxy resin obtained from Dow Chemical) was added along with 6.25 g (25% by weight) of VERSAMID 335 polyamide obtained from Cognis Corp. and 0.087 g (0.35% by weight) of triphenylphosphine as the reaction catalyst. The mixture was stirred for 1 hour at 90° C., after which time was first added a prepared solution of acrylic acid (4.63 g, 18.5% by weight) and 4-methoxyphenol as a polymerization inhibitor (0.0125 g, 0.05% by weight), followed with a second prepared solution containing lauric acid (1.43 g, 5.75% by weight) and triphenylphosphine (0.087 g, 0.35% by weight). The temperature of the reaction mixture was increased to 115° C. and stirred for an additional 3 hours, thereby forming the acrylate-modified epoxy-polyamide composite gellant. The hot product was poured out of the flask into a container to obtain a hardened, yellow, opaque semi-solid material with a yield of 21.1 grams. $^1$H-NMR spectroscopic analysis (300 MHz, CDCl$_3$) of this material shows the presence of a new set of acrylate hydrogens that differed in chemical shift from those of acrylic acid, and did not clearly reveal the presence of any unreacted epoxy-group hydrogens.

Examples 10-11

Gellants

Two additional gellants were prepared using the same materials and process as described for the gellant of Example 9, except with varying relative amounts of the DER 736 epoxy resin, VERSAMID 335 polyamide, acrylic and lauric acid components. The compositions of gellants Examples 9-11 are summarized in Table 2.

Example 12

Gellant

A curable epoxy polyamide composite gallant was prepared as follows. In a 200 mL round bottom flask equipped with reflux condenser, thermometer and addition funnel, 7.125 g (28.5% by weight of total materials) of DER 383 (a Bisphenol A-co-epichlorohydrin epoxy resin obtained from Dow Chemical) was added along with 14.25 g (57.0% by weight) of VERSAMID 963 polyamide obtained from Cognis Corp. and 0.087 g (0.35% by weight) of triphenylphosphine as the reaction catalyst. The mixture was stirred for 1 hour at 90° C., after which time was first added a prepared solution of acrylic acid (2.58 g, 10.35% by weight) and 4-methoxyphenol as polymerization inhibitor (0.0125 g, 0.05% by weight), followed with a second prepared solution containing lauric acid (0.85 g, 3.40% by weight) and triphenylphosphine (0.087 g, 0.35% by weight). The temperature of the reaction mixture was increased to 115° C. and stirred for an additional 3 hours, thereby forming the acrylate modified epoxy-polyamide composite gallant. The hot product was poured out of the flask into a container to obtain a hardened, yellow opaque semi-solid material with a yield of 23.6 grams. $^1$H-NMR spectroscopic analysis (300 MHz, CDCl$_3$) of this material shows the presence of a new set of acrylate hydrogens that differed in chemical shift from those of acrylic acid, and did not clearly reveal the presence of any unreacted epoxy-group hydrogens.

Example 13

Gellant

A gellant was prepared using the same materials and process as described for the gellant of Example 12, except with different relative amounts of the DER 383 epoxy resin, VERSAMID 963 polyamide resin, acrylic and lauric acid components, as summarized in Table 2.

Example 14

Gellant

A curable epoxy polyamide composite gellant was prepared as follows. In a 200 mL round bottom flask equipped with reflux condenser, thermometer and addition funnel, 7.125 g (28.5% by weight of total materials) of DER 736 (a dipropylene glycol-based epoxy resin obtained from Dow Chemical) was added along with 14.25 g (57.0% by weight) of VERSAMID 338 polyamide obtained from Cognis Corp. and 0.087 g (0.35% by weight) of triphenylphosphine as the reaction catalyst. The mixture was stirred for 1 hour at 90° C., after which time was first added a prepared solution of acrylic acid (2.58 g, 10.35% by weight) and 4-methoxyphenol as polymerization inhibitor (0.0125 g, 0.05% by weight), followed with a second prepared solution containing lauric acid (0.85 g, 3.40% by weight) and triphenylphosphine (0.087 g, 0.35% by weight). The temperature of the reaction mixture was increased to 115° C. and stirred for an additional 3 hours, thereby forming the acrylate modified epoxy-polyamide composite gellant. The hot product was poured out of the flask into a container to obtain a hardened, yellow opaque semi-solid material with a yield of 24.0 grams. $^1$H-NMR spectroscopic analysis (300 MHz, CDCl$_3$) of this material shows the presence of a new set of acrylate hydrogens that differed in chemical shift from those of acrylic acid, and did not clearly reveal the presence of any unreacted epoxy-group hydrogens.

Example 15

Gellant

A gellant was prepared using the same materials and process as described for the gellant of Example 14, except with different relative amounts of the DER 736 epoxy resin, VERSAMID 338 polyamide resin, acrylic and lauric acid components, as summarized in Table 2.

The relative compositions of Examples 1-15 gellants are summarized in Tables 1 and 2, expressed as the relative weight-percentage amount of total raw materials charged (out of a total of 100% by weight) for each gellant composition.

TABLE 1

| Material Class | Raw Materials | Example 1 %-wt of total | Example 2 %-wt of total | Example 3 %-wt of total | Example 4 %-wt of total | Example 5 %-wt of total | Example 6 %-wt of total |
|---|---|---|---|---|---|---|---|
| Epoxy resins | DER 383 | 44.67 | 50.00 | 42.11 | 39.70 | 28.50 | 28.50 |
| | DER 736 | — | — | — | — | — | — |
| Polyamide resins PA-1 | VERSAMID 335 | 24.81 | 10.00 | 21.05 | 39.70 | — | — |
| | VERSAMID 338 | — | — | — | — | — | — |
| | VERSAMID 795 | — | — | — | — | — | 57.00 |
| | VERSAMID 963 | — | — | — | — | — | — |
| | Sylvagel resin #1015-32 | — | — | — | — | 57.00 | — |
| ethylenically unsaturated reagent mixture (w/catalyst) | Acrylic Acid | 14.89 | 18.50 | 19.47 | 14.89 | 10.35 | 10.35 |
| | Methylhydroquinone | 0.05 | 0.05 | 0.05 | 0.05 | 0.05 | 0.05 |
| | triphenylphosphine | 0.35 | 0.35 | 0.37 | 0.35 | 0.35 | 0.35 |
| saturated reagent mixture (w/catalyst) | Lauric Acid | 4.96 | 5.75 | 6.05 | 4.96 | 3.40 | 3.40 |
| | triphenylphosphine | 0.35 | 0.35 | 0.37 | 0.35 | 0.35 | 0.35 |
| (optional) Reactive Diluent | NPPOGDA | 9.93 | 15.00 | 10.53 | 0.00 | 0.00 | 0.00 |
| TOTAL MATERIALS CHARGED (%-wt of total) | | 100.00 | 100.00 | 100.00 | 100.00 | 100.00 | 100.00 |
| Ratio [Epoxy:Polyamide] | | 1.8 | 5.0 | 2.0 | 1.0 | 0.5 | 0.5 |
| Ratio [Epoxy:Acrylic Acid] | | 3.0 | 2.7 | 2.2 | 2.7 | 2.8 | 2.8 |
| Ratio [Epoxy:Acrylic + Lauric Acid] | | 2.3 | 2.1 | 1.6 | 2.0 | 2.1 | 2.1 |
| Ratio [Acrylic:Lauric Acids] | | 3.0 | 3.2 | 3.2 | 3.0 | 3.0 | 3.0 |

| Material Class | Raw Materials | Example 7 %-wt of total | Example 8 %-wt of total | Example 9 %-wt of total | Example 10 %-wt of total |
|---|---|---|---|---|---|
| Epoxy resins | DER 383 | 40.00 | 46.00 | 50.00 | 45.00 |
| | DER 736 | — | — | — | — |
| Polyamide resins PA-1 | VERSAMID 335 | — | — | — | — |
| | VERSAMID 338 | — | — | — | — |
| | VERSAMID 795 | 40.00 | 30.50 | 25.00 | 35.00 |
| | VERSAMID 963 | — | — | — | — |
| | Sylvagel resin #1015-32 | — | — | — | — |
| ethylenically unsaturated reagent mixture (w/catalyst) | Acrylic Acid | 14.25 | 16.75 | 18.50 | 14.75 |
| | Methylhydroquinone | 0.05 | 0.05 | 0.05 | 0.05 |
| | triphenylphosphine | 0.35 | 0.35 | 0.35 | 0.35 |
| saturated reagent mixture (w/catalyst) | Lauric Acid | 5.00 | 6.00 | 5.75 | 4.50 |
| | triphenylphosphine | | | 0.35 | 0.35 |
| (optional) Reactive Diluent | NPPOGDA | 0.00 | 0.00 | 0.00 | 0.00 |
| TOTAL MATERIALS CHARGED (%-wt of total) | | 100.00 | 100.00 | 100.00 | 100.00 |
| Ratio [Epoxy:Polyamide] | | 1.0 | 1.5 | 2.0 | 1.3 |
| Ratio [Epoxy:Acrylic Acid] | | 2.7 | 2.8 | 2.7 | 3.1 |
| Ratio [Epoxy:Acrylic + Lauric Acid] | | 2.1 | 2.0 | 2.1 | 2.3 |
| Ratio [Acrylic:Lauric Acids] | | 2.9 | 2.8 | 3.2 | 3.3 |

TABLE 2

| Material Class | Raw Materials | Example 11 %-wt of total | Example 12 %-wt of total | Example 13 %-wt of total | Example 14 %-wt of total |
|---|---|---|---|---|---|
| Epoxy resins | DER 383 | — | — | — | 28.50 |
| | DER 736 | 50.00 | 44.67 | 52.50 | — |
| Polyamide resins PA-1 | VERSAMID 335 | 25.00 | 34.74 | 21.00 | — |
| | VERSAMID 338 | — | — | — | — |
| | VERSAMID 795 | — | — | — | — |
| | VERSAMID 963 | — | — | — | 57.00 |
| | Sylvagel resin #1015-32 | — | — | — | — |
| ethylenically unsaturated reagent mixture (w/catalyst) | Acrylic Acid | 18.50 | 14.89 | 19.44 | 10.35 |
| | Methylhydroquinone | 0.05 | 0.05 | 0.05 | 0.05 |
| | triphenylphosphine | 0.35 | 0.35 | 0.35 | 0.35 |
| saturated reagent mixture (w/catalyst) | Lauric Acid | 5.75 | 4.96 | 6.31 | 3.40 |
| | triphenylphosphine | 0.35 | 0.35 | 0.35 | 0.35 |
| (optional) Reactive Diluent | NPPOGDA | 0.00 | 0.00 | 0.00 | 0.00 |
| TOTAL MATERIALS CHARGED (%-wt of total) | | 100.00 | 100.00 | 100.00 | 100.00 |
| Ratio [Epoxy:Polyamide] | | 2.0 | 1.3 | 2.5 | 0.5 |
| Ratio [Epoxy:Acrylic Acid] | | 2.7 | 3.0 | 2.7 | 2.8 |
| Ratio [Epoxy:Acrylic + Lauric Acid] | | 2.1 | 2.3 | 2.0 | 2.1 |
| Ratio [Acrylic:Lauric Acids] | | 3.2 | 3.0 | 3.1 | 3.0 |

| Material Class | Raw Materials | Example 15 %-wt of total | Example 16 %-wt of total | Example 17 %-wt of total |
|---|---|---|---|---|
| Epoxy resins | DER 383 | 50.00 | — | — |
| | DER 736 | — | 28.50 | 50.00 |
| Polyamide resins PA-1 | VERSAMID 335 | — | — | — |
| | VERSAMID 338 | — | 57.00 | 25.00 |
| | VERSAMID 795 | — | — | — |
| | VERSAMID 963 | 25.00 | — | — |
| | Sylvagel resin #1015-32 | — | — | — |
| ethylenically unsaturated reagent mixture (w/catalyst) | Acrylic Acid | 18.75 | 10.35 | 18.50 |
| | Methylhydroquinone | 0.05 | 0.05 | 0.05 |
| | triphenylphosphine | 0.35 | 0.35 | 0.35 |
| saturated reagent mixture (w/catalyst) | Lauric Acid | 5.75 | 3.40 | 5.75 |
| | triphenylphosphine | 0.35 | 0.35 | 0.35 |
| (optional) Reactive Diluent | NPPOGDA | 0.00 | 0.00 | 0.00 |
| TOTAL MATERIALS CHARGED (%-wt of total) | | 100.00 | 100.00 | 100.00 |
| Ratio [Epoxy:Polyamide] | | 2.0 | 0.5 | 2.0 |
| Ratio [Epoxy:Acrylic Acid] | | 2.7 | 2.8 | 2.7 |
| Ratio [Epoxy:Acrylic + Lauric Acid] | | 2.0 | 2.1 | 2.1 |
| Ratio [Acrylic:Lauric Acids] | | 3.3 | 3.0 | 3.2 |

Example 16

Curable Ink

A radiation-curable ink composition was prepared using the gellant of Example 7. The gellant material (8 parts) was first dissolved in propoxylated neopentylglycol diacrylate (29.8 parts) and 15 parts caprolactone acrylate to which was added a mixture of photoinitiators consisting of 3.5 parts 2-hydroxy-1-(4-(4-(2-hydroxy-2-methylpropionyl)-benzyl)-phenyl)-2-methylpropan-1-one, 3 parts 2-dimethylamino-2-(4-methylbenzyl)-1-(4-morpholin-4-ylphenyl)-butanone, 1 part bis(2,4,6-trimethylbenzoyl)-phenyl-phosphine oxide and 2 parts isopropyl-9H-thioxanthen-9-one followed by 0.2 parts of IRGASTAB UV 10 obtained from Ciba Specialty Chemicals, followed lastly by 37.5 parts Pigment Red 202 dispersion consisting 86.67 percent propoxylated neopentylglycol diacrylate, 8% Pigment Red 202 and 5.9% SOL-SPERSE 34750. The rheology of the ink composition was measured and found to have viscosities of 11.3 mPa·s at 80° C. and $9.8 \times 10^5$ mPa·s at 30° C., and the storage modulus (G') of the ink at 30° C. was found to be 5750 Pascals (Pa).

Example 17

Curable Ink

A radiation-curable ink composition was prepared using the gellant of Example 1 except that no reactive diluent was used in preparation. The gellant material (12 g) was first dissolved in propoxylated neopentylglycol diacrylate (42.3 g), to which was added a mixture of photoinitiators consisting of 3 g 1-(4-(2-hydroxyethoxy)phenyl)-2-hydroxy-2-methyl-propan-1-one, 3 g bis(2,4,6-trimethylbenzoyl)-phenyl-phosphine oxide and 2 g isopropyl-9H-thioxanthen-9-one followed by 0.2 g of IRGASTAB UV 10 obtained from Ciba Specialty Chemicals, followed lastly by 37.5 g Pigment Black 7 dispersion consisting 91.7 percent propoxylated neopentylglycol diacrylate, NIPEX 150 ex DeGussa and EFKA-7496. The rheology of the ink composition was measured and found to have viscosities of 8.2 mPa·s at 75° C. and 6.72×10$^5$ mPa·s at 30° C., and the storage modulus (G') of the ink at 30° C. was found to be 1117 pascals (Pa).

Example 18

Curable Ink

A radiation-curable ink composition was prepared using the gellant of Example 10 except that no reactive diluent was used in preparation. The gellant material (8 g) was first dissolved in propoxylated neopentylglycol diacrylate (35.3 g), and 10 g caprolactone acrylate to which was added a mixture of photoinitiators consisting of 3 g 1-(4-(2-hydroxyethoxy)phenyl)-2-hydroxy-2-methylpropan-1-one, 3 g IRGACURE 379 and 2 g isopropyl-9H-thioxanthen-9-one followed by 0.2 g of IRGASTAB UV 10 obtained from Ciba Specialty Chemicals, followed lastly by 37.5 g Pigment Black 7 dispersion consisting 91.7 percent propoxylated neopentylglycol diacrylate, NIPEX 150 ex DeGussa and EFKA-7496. The rheology of the ink composition was measured and found to have viscosities of 10.9 mPa·s at 80° C. and 1.58×10$^5$ mPa·s at 35° C., and the storage modulus (G') of the ink at 35° C. was found to be 988 Pa.

Examples 19-21

The impact of changing the ratio of polyepoxy component to polyamide component in the gellant was examined in the following series of inks found in Table 3. The Pigment Black 7 dispersion employed the same formulation as found in Example 18.

TABLE 3

Ink formulations containing Epoxy PA Gellant with variable ratios of Epoxy/Polyamide

| Components | Example 19 | Example 20 | Example 21 |
|---|---|---|---|
| Example 6 | 8 | | |
| Example 7 | | 8 | |
| Example 8 | | | 8 |
| isopropyl-9H-thioxanthen-9-one | 2 | 2 | 2 |
| bis(2,4,6-trimethylbenzoyl)-phenyl-phosphine oxide | 1 | 1 | 1 |
| 2-hydroxy-1-(4-(4-(2-hydroxy-2-methylpropionyl)-benzyl)-phenyl)-2-methylpropan-1-one | 3.5 | 3.5 | 3.5 |
| 2-dimethylamino-2-(4-methylbenzyl)-1-(4-morpholin-4-ylphenyl)-butanone | 3 | 3 | 3 |
| propoxylated neopentylglycol diacrylate | 30 | 30 | 30 |
| caprolactone acrylate | 15 | 15 | 15 |
| Pigment Black 7 dispersion | 37.5 | 37.5 | 37.5 |

A summary of the rheological behavior of Example inks 19-21 is summarized in Table 4.

TABLE 4

| | Example 19 | Example 20 | Example 21 |
|---|---|---|---|
| Complex viscosity at 75° C. (mPa·s) | 13.3 | 12.1 | 10 |
| Complex viscosity at 30° C. (mPa·s) | 6.09E+05 | 3.88E+05 | 5.85E+04 |
| G' at 30° C. (Pa) | 341 | 177 | 35.4 |
| Viscosity ratio @ 30° C./75° C. | 4.58E+04 | 3.21E+04 | 5.85E+03 |

Example 22

Curable Ink

A radiation curable phase change ink composition was prepared using the gellant of Example 10. The gellant material (18 g) was first dissolved in propoxylated neopentylglycol diacrylate (100 g), to which was added a mixture of photoinitiators consisting of 2-hydroxy-1-(4-(4-(2-hydroxy-2-methylpropionyl)-benzyl)-phenyl)-2-methylpropan-1-one, 2-dimethylamino-2-(4-methylbenzyl)-1-(4-morpholin-4-ylphenyl)-butanone, bis(2,4,6-trimethylbenzoyl)-phenylphosphine oxide and isopropyl-9H-thioxanthen-9-one (14.25 g), followed by 0.3 g of IRGASTAB UV 10 obtained from Ciba Specialty Chemicals, followed lastly by a Pigment Blue 15:4 dispersion obtained from Sun Chemical (22% pigment). The rheology of the ink composition was measured and found to have viscosities of 10.8 mPa·s at 80° C. and 2.18×10$^6$ mPa·s at 30° C., and the storage modulus (G') of the ink at 30° C. was found to be 13500 Pa. Table 3 shows the ratio of ink viscosity at 30° C. with the ink viscosity at 80° C. (suitable for jetting), expressed as (Visc@30° C./Visc@80° C.), was 2.0×10$^5$.

When formulated as an ink vehicle composition, using only 12% by weight of the gellant of Example 10 mixed with propoxylated neopentylglycol diacrylate such was found to have viscosities of 8.0 mPa·s at 80° C. and 1.31×10$^6$ mPa·s at 30° C., and the G' value (storage modulus) of the ink at 30° C. was 8200 Pa.

Example 23

Curable Ink Vehicle

Curable ink vehicle compositions were prepared using propoxylated neopentylglycol diacrylate (NPPOGDA) and gellants at various concentrations. The effect of adding the gellant is shown with respect to the storage modulus (G' max), transfuse viscosity at 30° C. and jetting viscosity at 80° C. The rheological data for this composition are shown in Table 5.

TABLE 5

| Example Gellants | Gellant Conc. In NPPOGDA (%-wt) | (Elastic Modulus) G' max @ 30° C. | Transfuse Viscosity @ 30° C. (mPa·s) | Jetting Viscosity @ 80° C. (mPa·s) | Viscosity Ratio (Visc@ 30° C./Visc@ 80° C.) |
|---|---|---|---|---|---|
| Example 1 | 14 | $2.06 \times 10^2$ | $4.00 \times 10^4$ | 9.44 | $4.24 \times 10^3$ |
| Example 2 | 17 | $5.87 \times 10^1$ | $1.20 \times 10^4$ | 10.93 | $1.10 \times 10^3$ |
| Example 3 | 17 | $1.56 \times 10^2$ | $2.54 \times 10^4$ | 8.8 | $2.89 \times 10^3$ |
| Example 5 | 9 | $6.23 \times 10^2$ | $7.05 \times 10^4$ | 7.36 | $9.57 \times 10^3$ |

TABLE 5-continued

| Example Gellants | Gellant Conc. In NPPOGDA (%-wt) | (Elastic Modulus) G' max @ 30° C. | Transfuse Viscosity @ 30° C. (mPa·s) | Jetting Viscosity @ 80° C. (mPa·s) | Viscosity Ratio (Visc@ 30° C./ Visc@ 80° C.) |
|---|---|---|---|---|---|
| Example 10 | 12 | $2.21 \times 10^3$ | $5.51 \times 10^5$ | 6.52 | $8.4 \times 10^4$ |
| Example 11 | 9 | $2.76 \times 10^2$ | $4.91 \times 10^4$ | 7.01 | $7 \times 10^3$ |
| Example 15 | 9 | 11.25 | $5.56 \times 10^3$ | 5.82 | $9.55 \times 10^2$ |

While the inks have been described in conjunction with specific embodiments described above, it is evident that many alternatives, modifications and variations will be apparent to those skilled in the art. Accordingly, the preferred embodiments, as set forth above, are intended to be illustrative and not limiting. Various changes may be made without departing from the spirit and scope of the inks described herein.

What is claimed is:

1. A radiation curable phase change ink jet ink comprising an ink vehicle that includes:
    at least one gellant comprising a curable epoxy-polyamide composite gellant,
    at least one reactive diluent, and
    optionally at least one colorant,
wherein the ink has a viscosity of less than about 50 mPa·s at a jetting temperature of about 40° C. to about 110° C., the viscosity of the ink increasing by at least about $10^{2.5}$ mPa·s upon gelling of the ink at a temperature lower than the jetting temperature and in the temperature range of about 30° C. to about 70° C., and wherein the phase change ink has a storage modulus of at least about $10^2$ Pa in the temperature range of 30° C. to 50° C.

2. The radiation curable phase change ink according to claim 1, wherein the ink has a viscosity of from about 3 mPa·s to about 30 mPa·s at temperatures of from about 70° C. to about 90° C.

3. The radiation curable phase change ink according to claim 1, wherein the curable epoxy-polyamide composite gellant is comprised of an epoxy-group containing component comprising at least one of polyphenol-based epoxy resins, polyol-based epoxy resins or fatty acid epoxides, and a polyamide component.

4. The radiation curable phase change ink according to claim 3, wherein the polyamide component is comprised of polymerized fatty acids and polyamines, and wherein the polyamide component may optionally include polyether or polyester segments, or mixtures thereof.

5. The radiation curable phase change ink according to claim 3, wherein the relative weight percent ratio of the epoxy-group containing component and the polyamide component in the epoxy-polyamide composite gellant ranges from 20:1 to 0.1:1.

6. The radiation curable phase change ink according to claim 1, wherein the curable epoxy-polyamide composite gellant contains at least one ethylenically unsaturated functional group and/or at least one hydrocarbon group or mixtures thereof.

7. The radiation curable phase change ink according to claim 1, wherein the curable epoxy-polyamide composite gellant is present in an amount of from about 1 to about 50% by weight of the ink.

8. The radiation curable phase change ink according to claim 1, wherein the phase change ink further comprises one or more curable monomers, one or more curable oligomers, one or more curable polymers, or any mixture combination thereof.

9. The radiation curable phase change ink according to claim 1, wherein the phase change ink includes a reactive diluent selected from among isobornyl (meth)acrylate, lauryl (meth)acrylate, isodecyl(meth)acrylate, isooctyl(meth)acrylate, butyl acrylate, caprolactone acrylate, 2-phenoxyethyl acrylate, pentaerytritol tetra(metha)acrylate, 1,2 ethylene glycol di(meth)acrylate, 1,6 hexanediol di(meth)acrylate, 1,12-dodecanol di(meth)acrylate, propoxylated neopentyl glycol diacrylate, hexanediol diacrylate, tripropylene glycol diacrylate, dipropylene glycol diacrylate, amine modified polyether acrylates, trimethylolpropane triacrylate, tris (2-hydroxy ethyl) isocyanurate triacrylate, glycerol propoxylate triacrylate, dipentaerythritol penta-/hexa-acrylate, ethoxylated pentaerythritol tetraacrylate, and mixtures thereof.

10. The radiation curable phase change ink according to claim 1, wherein the phase change ink further includes at least one initiator comprising a photoinitiator, a thermal initiator, or mixtures thereof.

11. The radiation curable phase change ink according to claim 1, wherein the ink further comprises a nonreactive reactivity control agent.

12. The radiation curable phase change ink of claim 1, wherein the reactive diluent comprises propoxylated neopentylglycol diacrylate.

13. The radiation curable phase change ink of claim 1, wherein the at least one reactive diluent is propoxylated neopentylglycol diacrylate, reactive caprolactone acrylate, or combinations thereof.

14. The radiation curable phase change ink of claim 1, wherein the storage modulus is from about $10^2$ Pa to about $13.5 \times 10^3$ Pa in the temperature range of about 30° C. to about 50° C.

15. The radiation curable phase change ink of claim 1, including at least one colorant.

16. The radiation curable phase change ink of claim 15, wherein the at least one colorant comprises from about 0.1% to about 15% by weight of the ink.

17. A method of forming an image, comprising
    heating a radiation curable phase change ink jet ink to a jetting temperature of about 40° C. to about 110° C., wherein the ink comprises an ink vehicle that includes at least one gellant comprising a curable epoxy-polyamide composite gellant, at least one reactive diluent, and at least one colorant, and wherein the ink has a viscosity of less than about 50 mPa·s at the jetting temperature, the viscosity of the ink increasing by at least about $10^{2.5}$ mPa·s upon gelling of the ink at a temperature lower than the jetting temperature and in the temperature range of about 30° C. to about 70° C., wherein the phase change ink has a storage modulus of at least about $10^2$ Pa in the temperature range of 30° C. to 50° C., and wherein the viscosity of the ink at the jetting temperature allows the ink to be jetted;

jetting the heated phase change ink onto a substrate, wherein the substrate is maintained at a temperature, lower than the jetting temperature, at which the phase change ink forms a gel state;

wherein the substrate comprises an image receiving substrate or wherein the substrate is an intermediate transfer member and the phase change ink is subsequently transferred from the intermediate transfer member to an image receiving substrate; and exposing the phase change ink on the image receiving substrate to radiation energy to cure the curable components of the radiation curable phase change ink.

18. The method according to claim 17, wherein the radiation curable phase change ink further comprises at least one photoinitiator, and the radiation energy comprises radiation having a wavelength of from about 200 nm to about 560 nm.

* * * * *